United States Patent
Matsunami et al.

(10) Patent No.: US 9,588,482 B2
(45) Date of Patent: Mar. 7, 2017

(54) IMAGE FORMING APPARATUS

(71) Applicant: FUJI XEROX CO., LTD., Tokyo (JP)

(72) Inventors: Shohei Matsunami, Kanagawa (JP); Yuji Hayakawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/932,262

(22) Filed: Nov. 4, 2015

(65) Prior Publication Data

US 2016/0370753 A1 Dec. 22, 2016

(30) Foreign Application Priority Data

Jun. 22, 2015 (JP) .................................. 2015-124432

(51) Int. Cl.
*G03G 21/16* (2006.01)
*H04N 1/00* (2006.01)
*B41J 29/06* (2006.01)

(52) U.S. Cl.
CPC .......... *G03G 21/1619* (2013.01); *B41J 29/06* (2013.01); *H04N 1/00557* (2013.01); *H04N 1/00562* (2013.01)

(58) Field of Classification Search
CPC .......... G03G 21/1604; G03G 21/1619; H04N 1/00557; H04N 1/00562; B41J 29/02; B41J 29/06
See application file for complete search history.

(56) References Cited

U.S. PATENT DOCUMENTS

| | | | | |
|---|---|---|---|---|
| 4,637,581 | A * | 1/1987 | Wong | G03G 15/00 248/188.3 |
| 6,308,025 | B1 * | 10/2001 | Okano | G03G 15/00 347/152 |
| 6,837,339 | B2 * | 1/2005 | Lees | E06C 7/44 182/200 |
| 8,894,059 | B2 * | 11/2014 | Yoshida | B65H 5/00 271/145 |
| 2005/0123318 | A1 * | 6/2005 | Nishitani | G03G 15/00 399/107 |
| 2005/0162496 | A1 * | 7/2005 | Elenes | B41J 29/06 347/108 |
| 2007/0246638 | A1 * | 10/2007 | Idehara | G03G 21/1604 248/677 |
| 2009/0152435 | A1 * | 6/2009 | Kondo | G05G 1/60 248/634 |
| 2013/0195503 | A1 * | 8/2013 | Nakagaki | G03G 21/1619 399/107 |
| 2014/0049376 | A1 * | 2/2014 | Ng | A47B 91/00 340/10.1 |
| 2014/0356021 | A1 * | 12/2014 | Sato | G03G 21/1619 399/107 |

FOREIGN PATENT DOCUMENTS

JP 2010-054542 A 3/2010

* cited by examiner

*Primary Examiner* — David Gray
*Assistant Examiner* — Carla Therrien
(74) *Attorney, Agent, or Firm* — Oliff PLC (57) ABSTRACT

An image forming apparatus includes a first leg part that supports a housing; a second leg part that supports the housing at a position away from the first leg part; and a third leg part that supports the housing, the third leg part being disposed, so as to be pivotable relative to the housing, at a position where a triangle is formed by connecting the first leg part, the second leg part, and the third leg part.

7 Claims, 11 Drawing Sheets

IMAGE FORMING APPARATUS

CROSS-REFERENCE TO RELATED APPLICATIONS

This application is based on and claims priority under 35 USC 119 from Japanese Patent Application No. 2015-124432 filed Jun. 22, 2015.

BACKGROUND

Technical Field

The present invention relates to an image forming apparatus.

SUMMARY

According to an aspect of the invention, there is provided an image forming apparatus including a first leg part that supports a housing; a second leg part that supports the housing at a position away from the first leg part; and a third leg part that supports the housing, the third leg part being disposed, so as to be pivotable relative to the housing, at a position where a triangle is formed by connecting the first leg part, the second leg part, and the third leg part.

BRIEF DESCRIPTION OF THE DRAWINGS

Exemplary embodiments of the present invention will be described in detail based on the following figures, wherein.

DETAILED DESCRIPTION

Next, referring to the drawings, the present invention will be described in more detail below by using exemplary embodiments and specific examples. Note that the present invention is not limited to those exemplary embodiments and specific examples.

Furthermore, it should be noted that, in the description given below with reference to the drawings, the drawings are schematic, and hence, the proportions of the dimensions are different from those in actuality. For ease of understanding, components that need not be described are not illustrated.

First Exemplary Embodiment

1. Overall Configuration and Operation of Image Forming Apparatus

Figure 1:
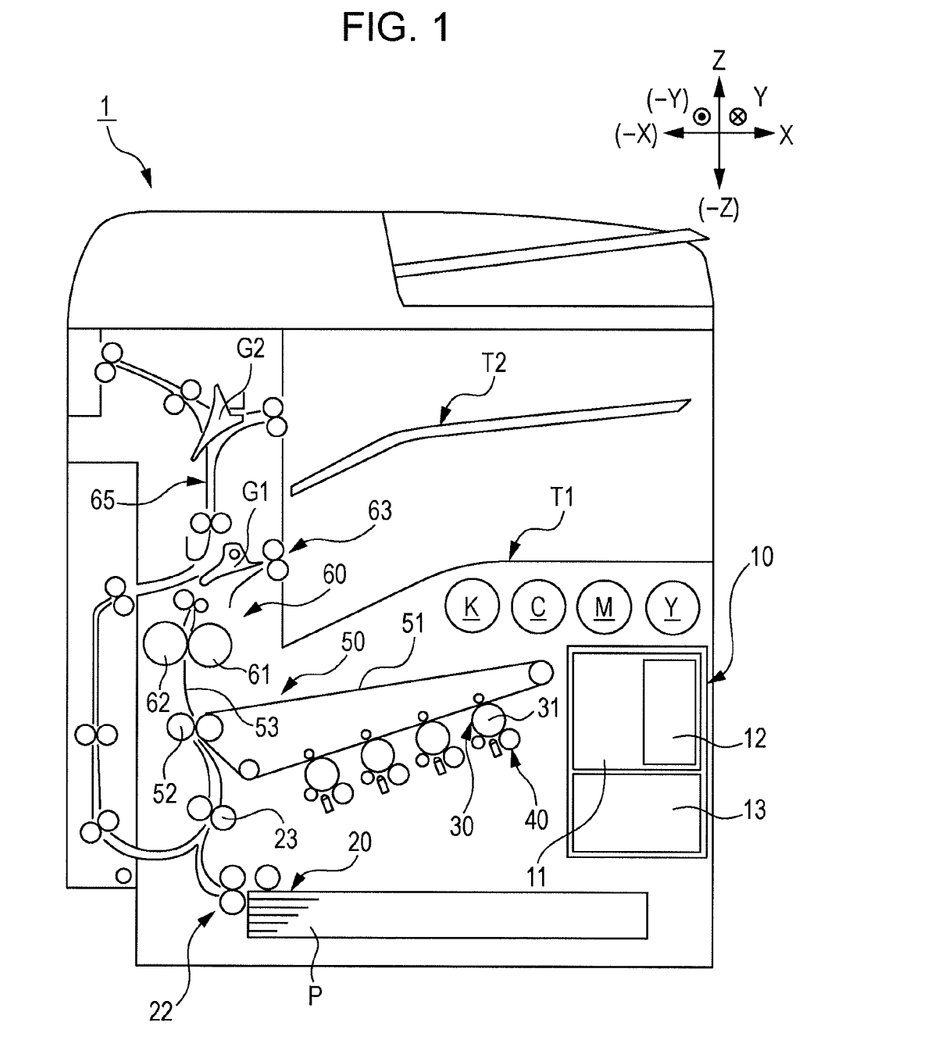
FIG. 1 is a schematic sectional view showing the inside structure of an image forming apparatus.

FIG. 1 is a vertical sectional view showing the inside structure of an image forming apparatus 1.

Referring to FIG. 1, the overall configuration and operation of the image forming apparatus 1 will be described.

The image forming apparatus 1 includes a control unit 10, a paper feed device 20, photoconductor units 30, developing devices 40, a transfer device 50, a fixing device 60, and a sheet transport device 70. The image forming apparatus 1 has a paper output tray portion T1 in the top surface (Z direction) thereof, on which sheets having an image recorded thereon are discharged and stored.

The control unit 10 includes a controller 11 that controls the operation of the image forming apparatus 1, an image processing portion 12 that is controlled by the controller 11, a power supply device 13, etc. The power supply device 13 applies voltages to the photoconductor units 30, the developing devices 40, the transfer device 50, etc.

The image processing portion 12 converts print information, which is input from an external information-transmitting device (for example, a personal computer or the like), into image information used to form a latent image and outputs a driving signal to exposure devices LH at predetermined timing.

The paper feed device 20 is provided at the bottom of the image forming apparatus 1. Sheets P stacked on a sheet tray are positioned in the widthwise direction by a restricting plate (not shown) and are picked up and fed forward (−X direction) one-by-one from the top by a sheet pickup portion 22.

The sheet P picked up by the sheet pickup portion 22 is transported to a nip portion between a registration roller pair 23.

The photoconductor units 30 are arranged side-by-side above (Z direction) the paper feed device 20 and include rotationally driven photoconductor drums 31. The developing devices 40 form yellow (Y), magenta (M), cyan (C), and black (K) toner images on the corresponding photoconductor drums 31.

The color toner images formed on the photoconductor drums 31 of the photoconductor units 30 are sequentially electrostatically transferred (first-transferred) to an intermediate transfer belt 51 of the transfer device 50, forming a superposed toner image, which is formed of color toner images superposed on one another. The superposed toner image on the intermediate transfer belt 51 is batch-transferred by a second transfer roller 52 to a sheet P fed from the registration roller pair 23 and guided by the transport guide.

In the fixing device 60, a fixing nip portion (fixing area), which is a contact area between a heating module 61 and a pressure module 62, forming a pair, is formed.

The sheet P having a toner image batch-transferred thereto in the transfer device 50 but not yet fixed is transported, via a transport guide 53, to the fixing nip portion of the fixing device 60, where the heating module 61 and the pressure module 62 apply pressure and heat to fix the toner image.

The sheet P having the toner image fixed is guided to a switching gate G1 and is discharged, through first discharge roller pair 63, onto the paper output tray portion TR1 formed in the top surface of the image forming apparatus 1 so as to be stored thereon. When the sheet P is reversed for two-sided printing or discharged with the image-recorded side facing up, the switching gate G1 switches the transport direction to send the sheet P toward the transport path 65.

2. Configuration of Housing

Figure 2:
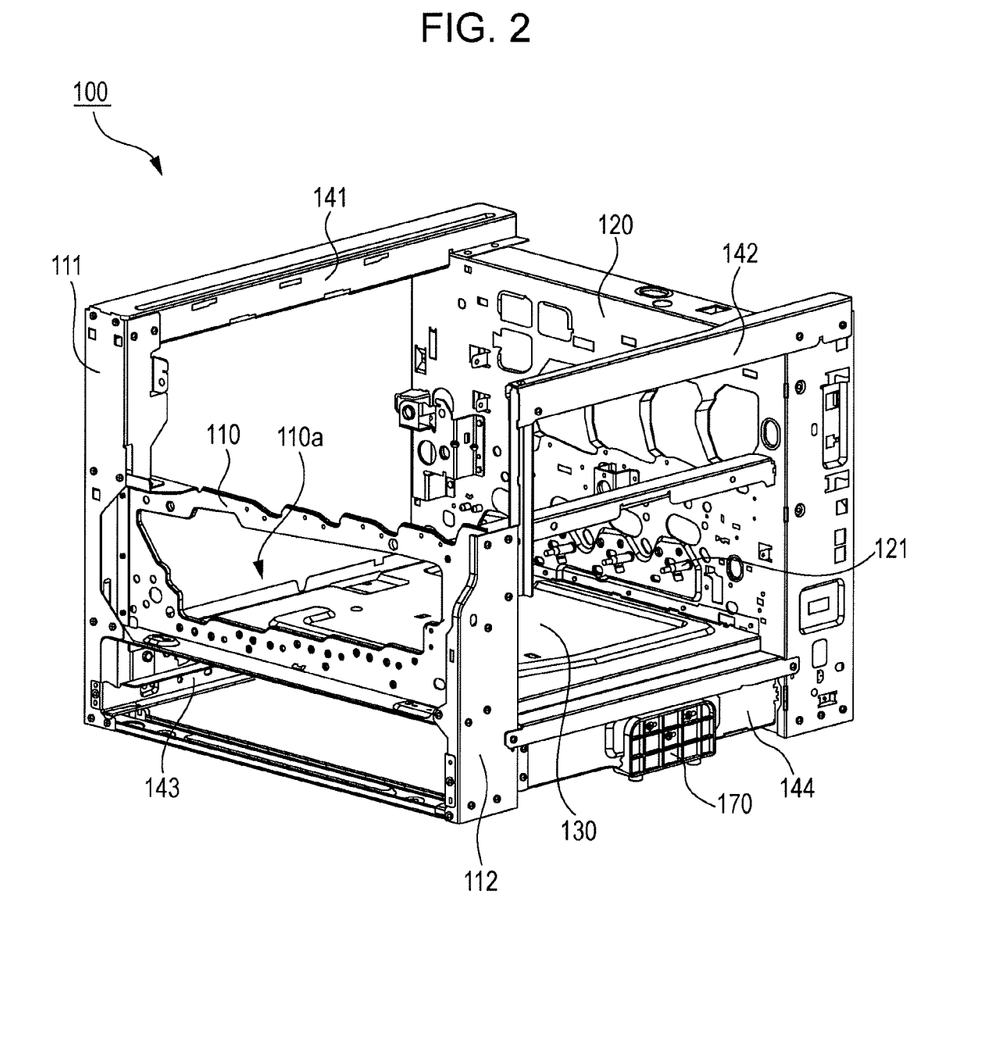
FIG. 2 is a perspective view of a housing, as viewed from a third leg part side.
Figure 3A:
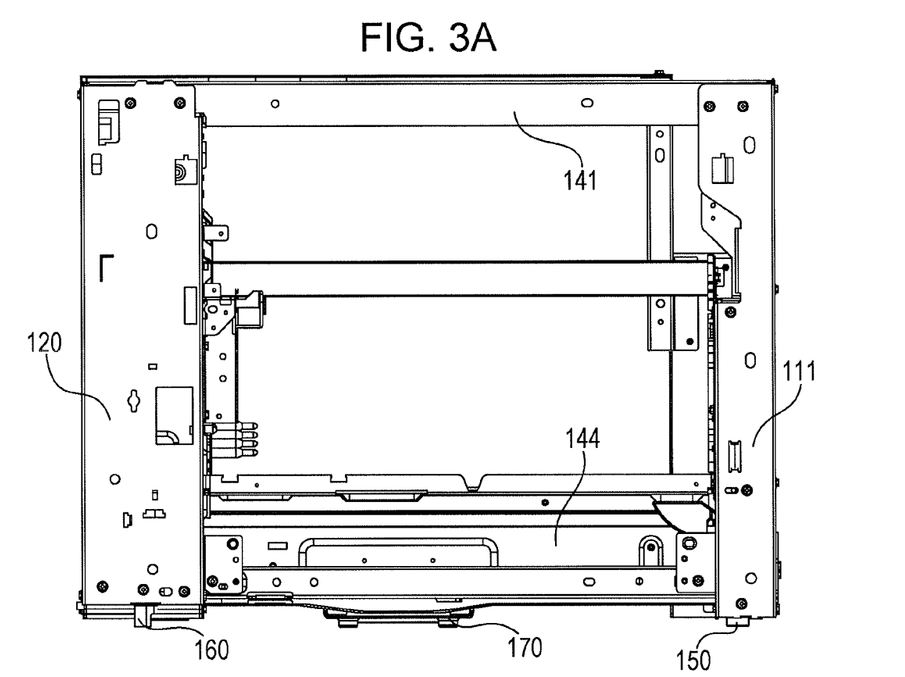
FIGS. 3A and 3B are a left side view and a right side view of the housing, respectively.
Figure 3B:
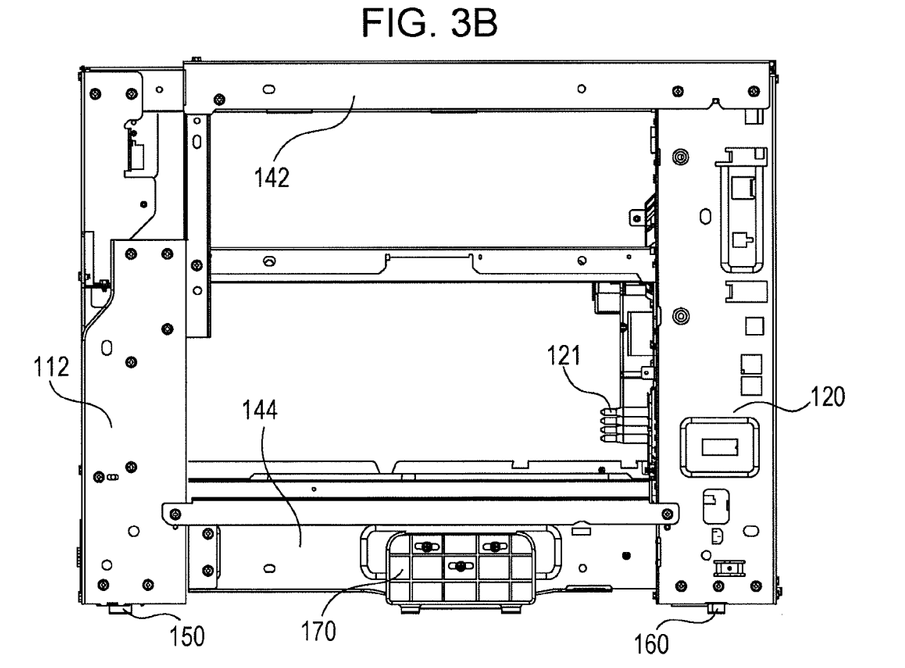
Figure 4:
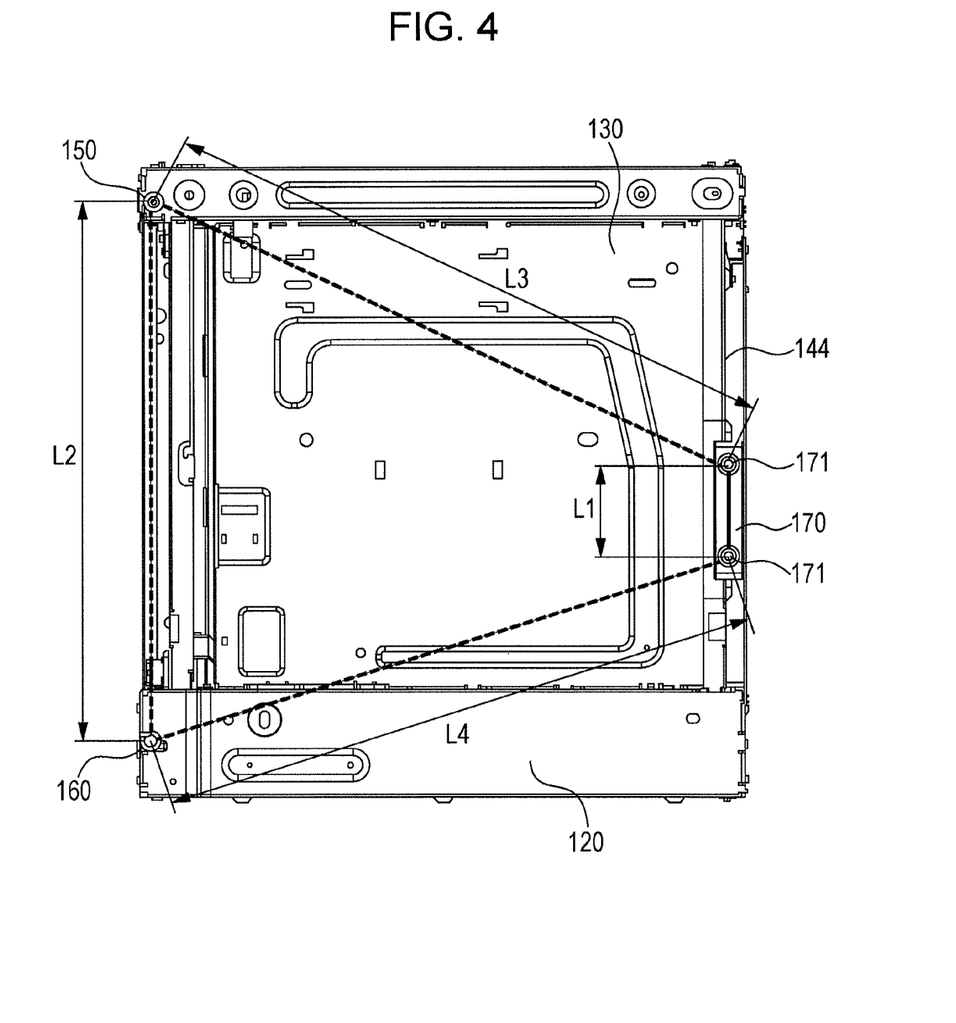
FIG. 4 is a bottom view of the housing.

FIG. 2 is a perspective view of the housing 100, as viewed from a third leg part side. FIGS. 3A and 3B are a left side view and a right side view of the housing 100, respectively. FIG. 4 is a bottom view of the housing 100.

Referring to FIGS. 2 to 4, the configuration of the housing 100 of the image forming apparatus 1 will be described.

As shown in FIG. 2, the housing 100 of the image forming apparatus 1 has a frame-like structure and includes a first side plate 110 and a second side plate 120, which are disposed so as to oppose each other; a first support bar 111 and a second support bar 112 that stand upright from the left and right ends of the first side plate 110, respectively; a bottom plate 130 that connects the first side plate 110 and the second side plate 120 at the bottom of the housing; a first connecting member 141 that connects the first support bar 111 and the second side plate 120 at the upper part of the housing; a second connecting member 142 that connects the second support bar 112 and the second side plate 120 at the upper part of the housing; a third connecting member 143 that connects the first support bar 111 and the second side plate 120 at the lower part of the housing; and a fourth connecting member 144 that connects the second support bar 112 and the second side plate 120 at the lower part of the housing.

The first side plate 110 is provided with an opening 110a that allows the photoconductor units 30, the developing devices 40, and the transfer device 50 (see FIG. 1) to be attached and detached from the front side of the image forming apparatus 1.

The second side plate 120 supports, on the inner surface thereof, driving-force transmitting portions 121 of a driving unit (not shown) that drives the photoconductor units 30, the developing devices 40, and the transfer device 50 accommodated in the housing 100. The driving-force transmitting portions 121 project inward.

An installation surface of a desk or a floor, on which the image forming apparatus 1 is to be installed, is not an even plane, but may have steps and irregularities. In order to suppress the twisting of the housing 100 caused by such steps and irregularities, in the height direction, in the installation surface, the housing 100 is provided with a first leg part 150, a second leg part 160, and a third leg part 170 on the bottom surface thereof, and the housing 100 is supported at three positions.

As shown in FIGS. 3 and 4, the first leg part 150 is fixed to the bottom surface of the first support bar 111, and the second leg part 160 is fixed to the bottom surface of the second side plate 120, at one end near the left side surface.

The third leg part 170 is provided at the middle portion of the fourth connecting member 144 that connects the second support bar 112 and the second side plate 120 at the lower part of the housing, so as to form a triangle when connected to the first leg part 150 and the second leg part 160 (see a dashed line in FIG. 4).

3. Support Structure for Housing

Figure 5A:
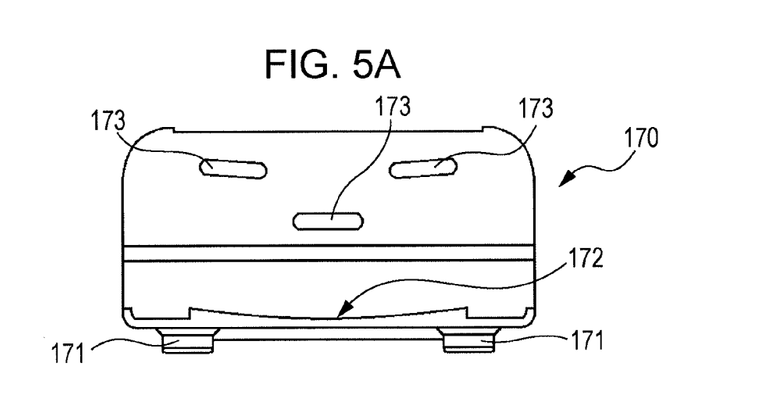
FIG. 5A is a back view of a third leg part, showing a surface at which the third leg part is to be mounted to the housing.
Figure 5B:
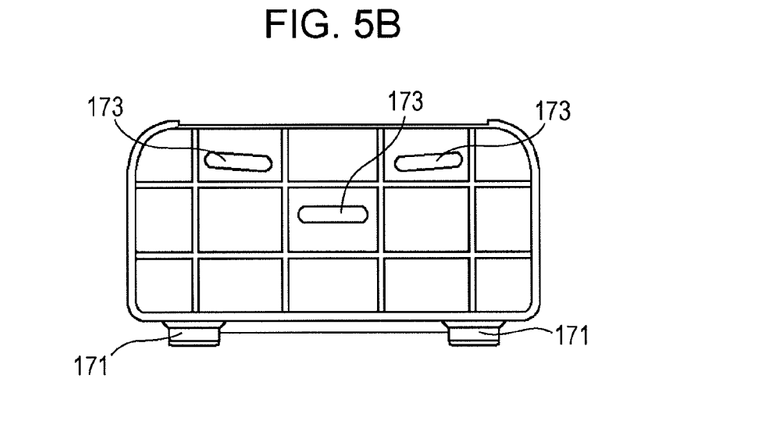
FIG. 5B is a front view of the third leg part, showing the outer surface.
Figure 5C:
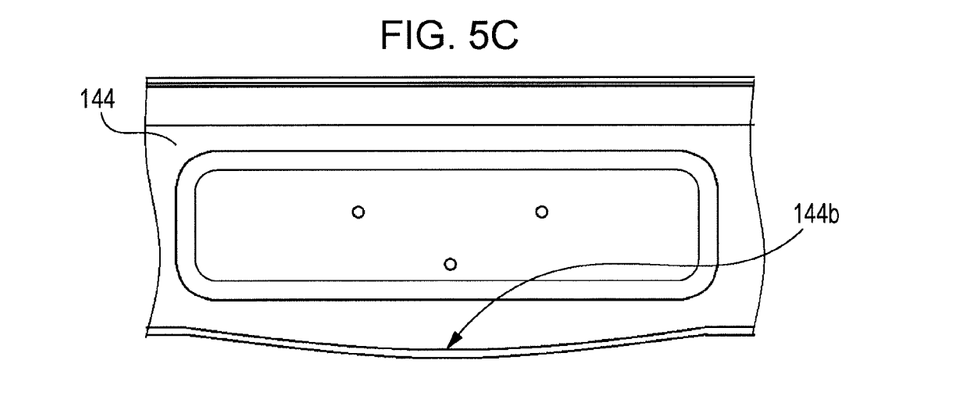
FIG. 5C shows a portion of the housing to which the third leg part is to be mounted.
Figure 6A:
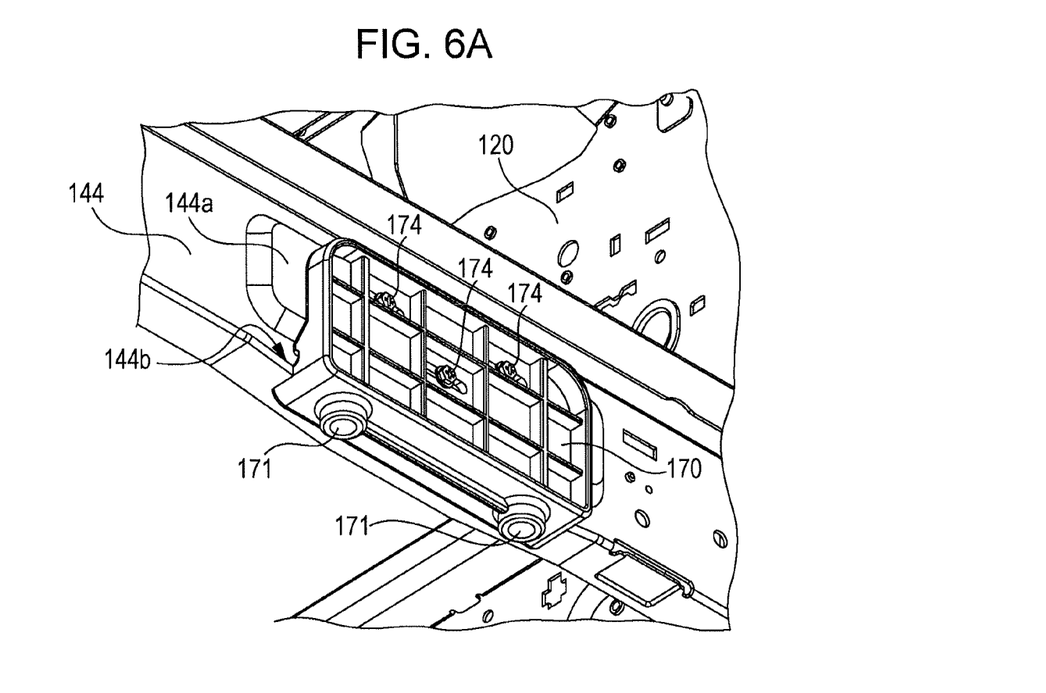
FIGS. 6A and 6B are perspective views showing the third leg part disposed on the housing, as viewed from the outer side and the inner side of the housing, respectively.
Figure 6B:
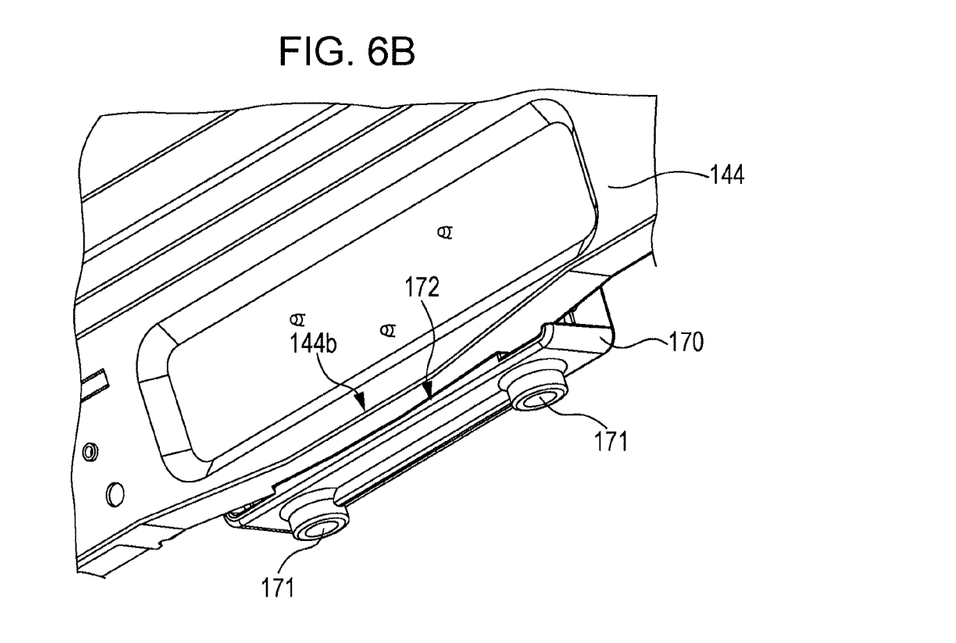
Figure 7A:
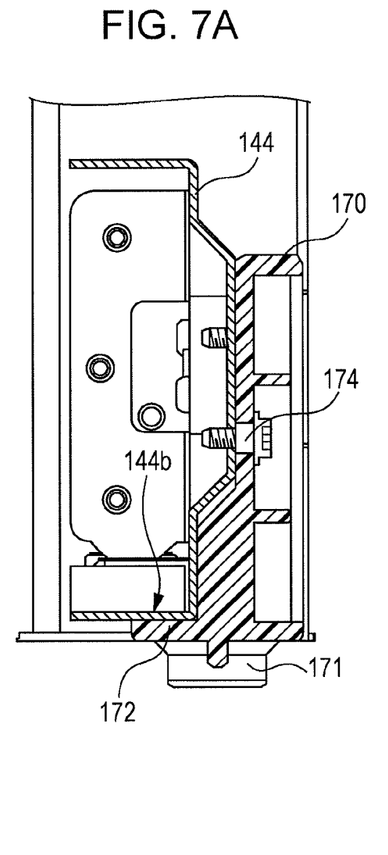
FIGS. 7A and 7B are vertical sectional views showing mounting of the third leg part to the housing, and a modification thereof, respectively.
Figure 7B:
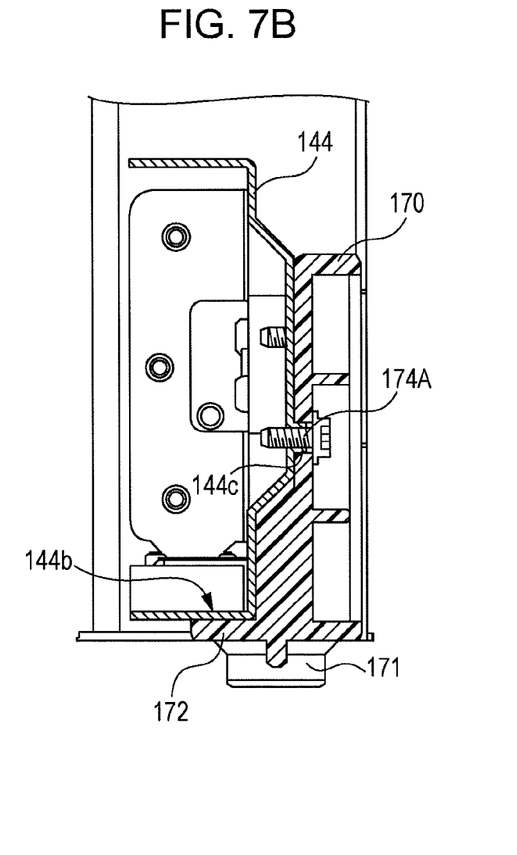

FIG. 5A is a back view of the third leg part 170, showing a surface at which the third leg part 170 is to be mounted to the housing 100; FIG. 5B is a front view of the third leg part 170, showing the outer surface; and FIG. 5C shows a portion of the housing 100 to which the third leg part 170 is to be attached. FIGS. 6A and 6B are perspective views showing the third leg part 170 disposed on the housing 100, as viewed from the outer side and the inner side of the housing 100, respectively. FIGS. 7A and 7B are vertical sectional views showing mounting of the third leg part 170 to the housing 100, and a modification thereof, respectively.

Referring to FIGS. 5A to 7B, a support structure for the housing 100 of the image forming apparatus 1 will be described.

As shown in FIG. 5A, the third leg part 170 is a rectangular plate-shaped member and has leg portions 171 and 171, separated from each other, formed on the bottom surface thereof. The leg portions 171 and 171, the first leg part 150, and the second leg part 160 share the weight of the image forming apparatus 1.

As shown in FIG. 4, the distance, L1, between the leg portions 171 and 171 is sufficiently smaller than the distance, L2, between the first leg part 150 and the second leg part 160, the distance, L3, between the first leg part 150 and the third leg part 170, and the distance, L4, between the second leg part 160 and the third leg part 170. The first leg part 150, the second leg part 160, and the third leg part 170 form a three-point support structure, as a whole.

As shown in FIG. 5C, the fourth connecting member 144 has a convex surface 144b at the middle portion. The third leg part 170 has a concave surface 172 on the inner side, which fits the convex surface 144b of the fourth connecting member 144.

As shown in FIG. 5B, the third leg part 170 has three elongated penetrating holes 173.

As shown in FIG. 6A, the fourth connecting member 144 has, on the outer surface thereof, a projecting mounting surface 144a for the third leg part 170. As shown in FIG. 7A, the third leg part 170 is mounted to the fourth connecting member 144 with shoulder screws 174 so as to be movable within the elongated holes 173.

As a result, as shown in FIG. 6B, the convex surface 144b of the fourth connecting member 144 and the concave surface 172 of the third leg part 170 fit together at the middle portion of the fourth connecting member 144, which connects the second support bar 112 and the second side plate 120 at the lower part of the housing 100, and the shoulder screws 174 inserted through the three elongated holes 173 constitute pivot shafts that support the housing 100 in a pivotable manner.

Modification 1

As shown in FIG. 7B, projecting bosses 144c may be formed on the mounting surface 144a of the fourth connecting member 144, inserted into the elongated holes 173 in the third leg part 170, and fastened with screws 174A so as to be movable. By doing so, the third leg part 170 supports the housing 100 so as to be movable, by forming pivot shafts with the three elongated holes 173 and the projecting bosses 144c formed on the mounting surface 144a.

Modification 2

The third leg part 170 may be provided with one through-hole at the center of the third leg part 170, instead of the three elongated holes 173, and mounted, with one shoulder screw, to the mounting surface 144a of the fourth connecting member 144 so as to be pivotable.

When the weight of the image forming apparatus 1 is a predetermined value or less, the task of mounting the third leg part 170 to the fourth connecting member 144 may be simplified.

4. Function of Support Structure

Figure 8A:
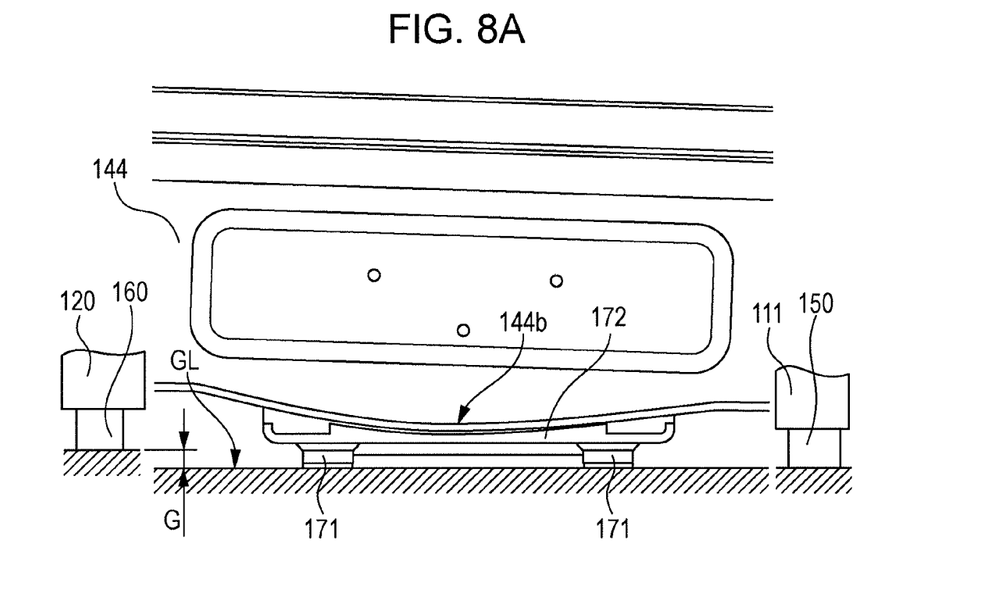
FIGS. 8A and 8B show pivoting of the third leg part when the installation surface has a step.
Figure 8B:
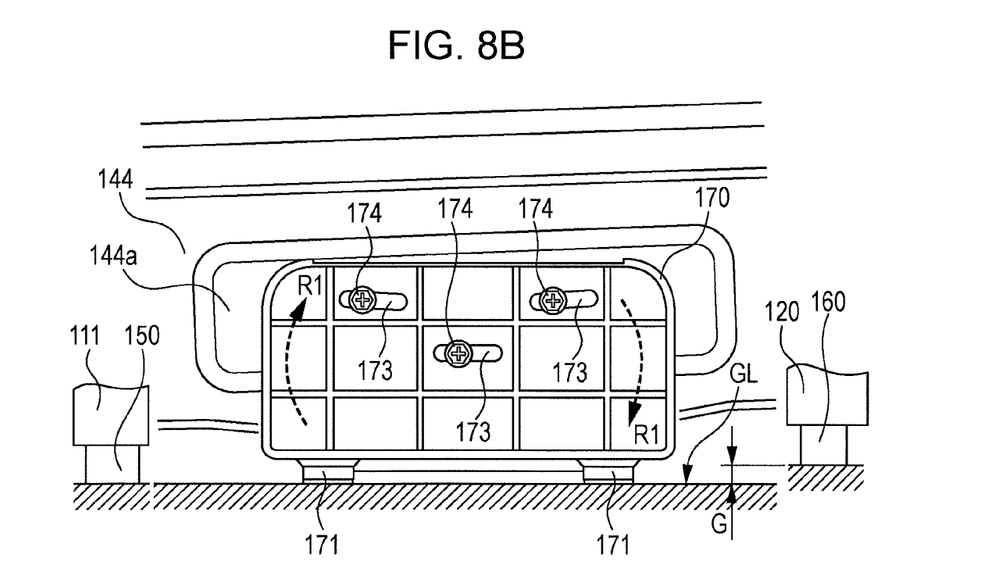
Figure 9A:
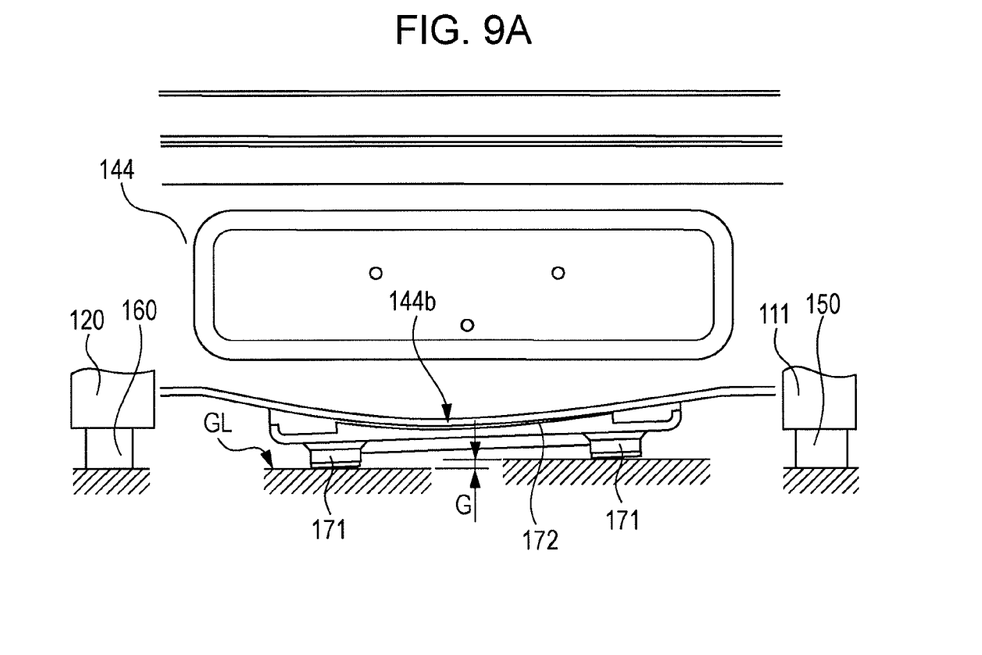
FIGS. 9A and 9B show pivoting of the third leg part when the installation surface has a step near the third leg part.
Figure 9B:
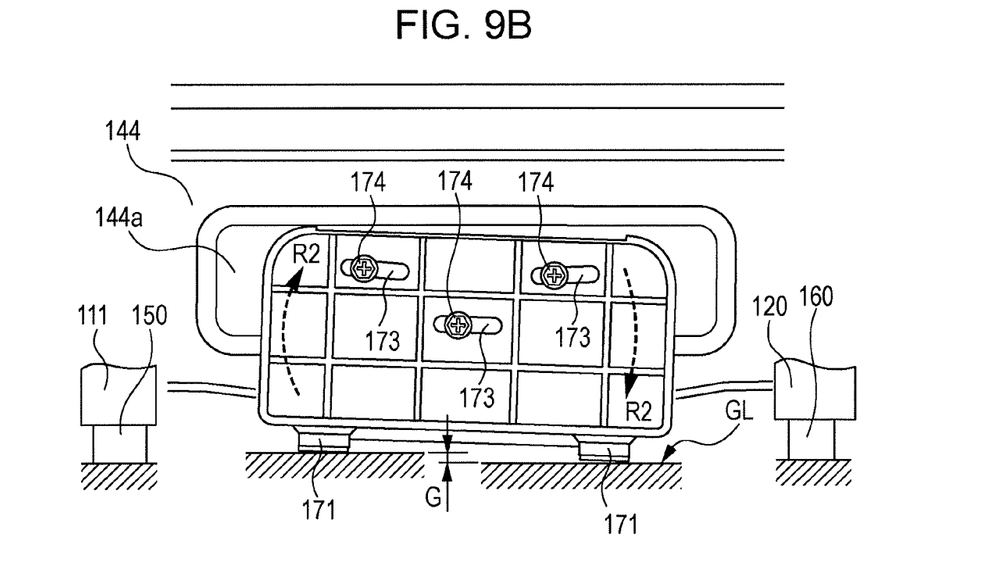
Figure 10:
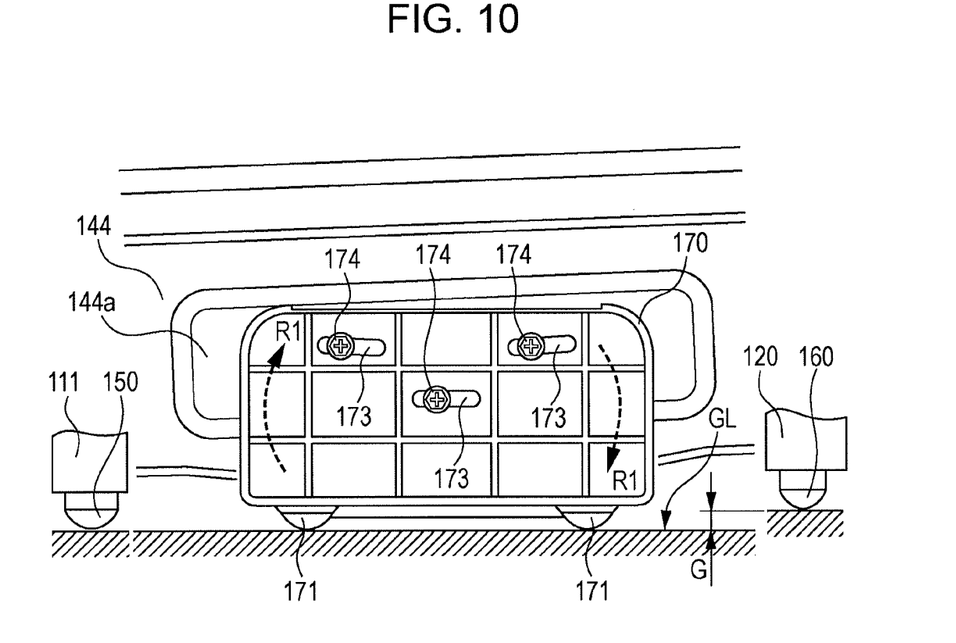
FIG. 10 shows the shape of grounding surfaces of the first leg part, the second leg part, and leg portions of the third leg part.

FIGS. 8A and 8B show pivoting of the third leg part 170 when the installation surface GL has a step, FIGS. 9A and 9B show pivoting of the third leg part 170 when the installation surface GL has a step near the third leg part 170, and FIG. 10 shows the shape of grounding surfaces of the first leg part 150, the second leg part 160, and the leg parts 171 of the third leg part 170. Referring to these figures, the function of the support structure will be described below.

When the installation surface GL has a step G, making the floor levels of the first leg part 150 and the second leg part 160 different and making the third connecting member 143 of the housing 100 inclined, the fourth connecting member 144 of the housing 100, serving as a frame structure, is also inclined.

In this state, the third leg part 170 pivots relative to the fourth connecting member 144, while supporting the weight of the image forming apparatus 1 over the concave surface 172 and the convex surface 144b of the fourth connecting member 144 that are in contact with each other at the middle portion of the fourth connecting member 144 (see arrow R1 in FIG. 8).

As a result, the leg portions 171 and 171 of the third leg part 170 are kept in contact with the installation surface GL, suppressing twisting of the housing 100.

Although the third leg part 170, the first leg part 150, and the second leg part 160 form a three-point support structure, the leg portions 171 and 171 are arranged with a distance L therebetween so as to stably support the weight of the image forming apparatus 1.

In this state, when the installation surface GL has a step G near the leg portions 171 and 171, the third leg part 170 pivots relative to the fourth connecting member 144, while supporting the weight of the image forming apparatus 1 over the convex surface 144b of the fourth connecting member 144 and the concave surface 172 that are in contact with each other (see arrow R2 in FIG. 9).

As a result, the third leg part 170 pivots relative to the first leg part 150 and the second leg part 160, suppressing twisting of the housing 100.

Although the first leg part 150, the second leg part 160, and the leg parts 171 of the third leg part 170 have been described as having circular flat grounding surfaces in this exemplary embodiment, the leg parts may have grounding surfaces that have a spherically rounded shape SR, as shown in FIG. 10. When the leg parts have grounding surfaces that have a spherically rounded shape SR, the leg parts always make point contact with the installation surface GL. Thus, an increase in twisting of the housing 100 attributable to the strain of the installation surface GL may be suppressed.

In this exemplary embodiment, the first leg part 150, the second leg part 160, and the leg portions 171 of the third leg part 170 are formed of a material formed by adding or copolymerizing elastomer to or with synthetic resin, such as acrylonitrile-butadiene-styrene (ABS), to prevent the image forming apparatus 1 from sliding on the installation surface GL.

Second Exemplary Embodiment

Figure 11A:
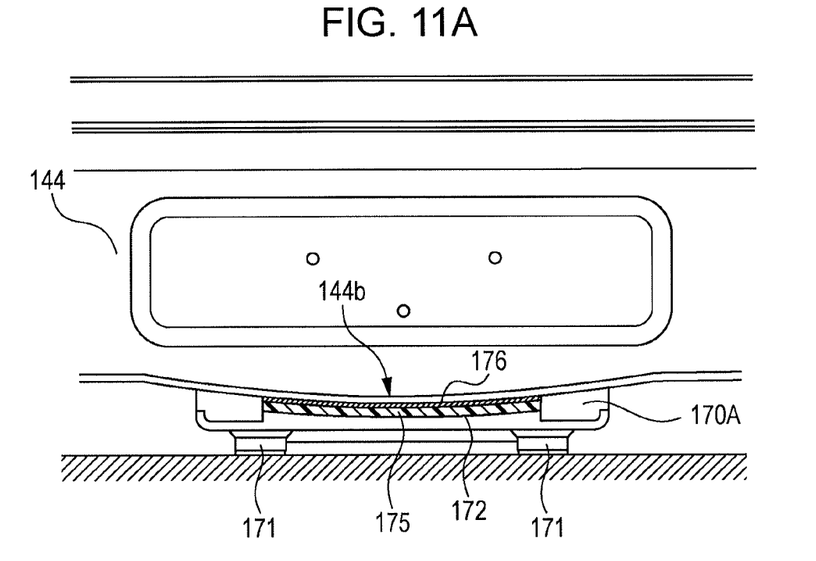
FIG. 11A is a back view of the third leg part, showing a surface to be mounted to the housing.
Figure 11B:
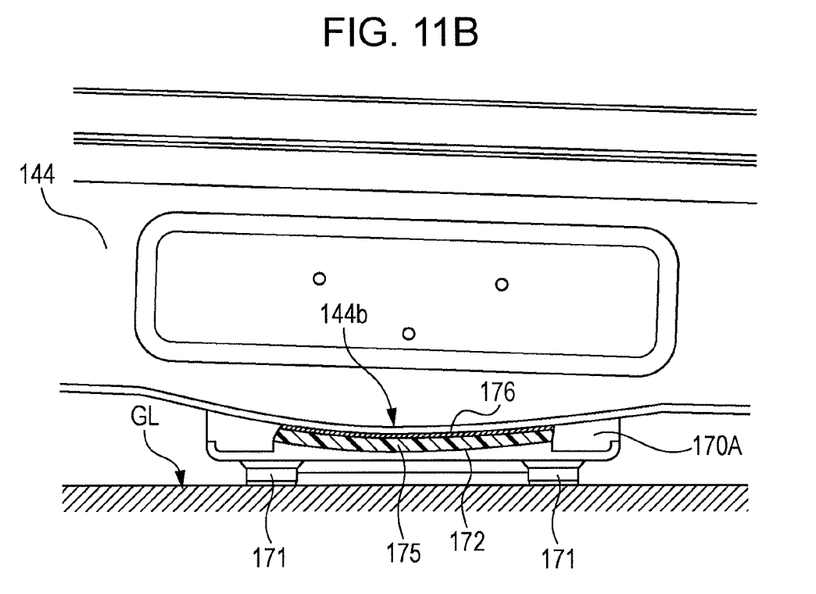
FIG. 11B shows pivoting of the third leg part when the installation surface has a step.

FIG. 11A is a back view of a third leg part 170A, showing a surface to be mounted to the housing 100, and FIG. 11B shows pivoting of the third leg part 170A when the installation surface GL has a step.

The configuration and function of the third leg part 170A according to this exemplary embodiment will be described in more detail below. Note that the components common to those of the third leg part 170 according to the first exemplary embodiment will be denoted by the same reference signs, and a detailed description thereof will be omitted.

The third leg part 170A has an elastic member 175 and a sliding member 176 on the concave surface 172.

The elastic member 175 is formed of elastomer resin, urethane resin, or the like. The sliding member 176 is formed of a PET sheet, a PTFE sheet, or the like.

The third leg part 170A pivots relative to the fourth connecting member 144, while supporting the weight of the image forming apparatus 1 over the concave surface 172 and the convex surface 144b of the fourth connecting member 144 that are in contact with each other, at the intermediate portion of the fourth connecting member 144, with the elastic member 175 and the sliding member 176 therebetween.

As shown in FIG. 9B, when the installation surface GL has a step G, making the floor levels of the first leg part 150 and the second leg part 160 different and making the third connecting member 143 of the housing 100 inclined, the fourth connecting member 144 of the housing 100, serving as the frame structure, is also inclined.

The third leg part 170A according to this exemplary embodiment is in contact with the convex surface 144b of the fourth connecting member 144 with the elastic member 175 and the sliding member 176 therebetween. Hence, by selecting the elasticity of the elastic member 175 and the coefficient of friction of the sliding member 176 according to the degree of twisting of the housing 100, the overall degree of twisting of the housing 100 may be adjusted.

More specifically, the image forming apparatus 1 may be used with additional attachments, such as a sheet transport device (not shown), a post-processing device (not shown), etc., and in such a case, the weight of the image forming apparatus 1 to be supported by the first leg part 150, the second leg part 160, and the third leg part 170A is large. This may also increase the degree of twisting of the housing 100 relative to the floor level difference existing in the installation surface GL.

With the third leg part 170A according to this exemplary embodiment, by selecting the elasticity of the elastic member 175 and the coefficient of friction of the sliding member 176 according to the degree of twisting of the housing 100 so as to adjust the sliding characteristics relative to the convex surface 144b of the fourth connecting member 144, it is possible to timely rotate the third leg part 170A and suppress an increase in degree of twisting of the housing 100.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a first leg part that supports a housing;
   a second leg part that supports the housing at a position away from the first leg part; and
   a third leg part that supports the housing, the third leg part being disposed, so as to be pivotable relative to the housing via three pivot shafts, at a position where a triangle is formed by connecting the first leg part, the second leg part, and the third leg part,
   wherein the position and angular orientation of the third leg part is adjustable relative to the housing via the three pivot shafts.

2. The image forming apparatus according to claim 1, wherein the third leg part supports a load of the housing between a convex surface and a concave surface that are in contact with each other at a position away from the three pivot shafts, one of the convex and concave surfaces arranged on the housing, and an other of the convex and concave surfaces arranged on the third leg.

3. The image forming apparatus according to claim 2, wherein the three pivot shafts are shoulder screws.

4. The image forming apparatus according to claim 3, further comprising an elastic member between the convex surface and the concave surface.

5. The image forming apparatus according to claim 2, further comprising an elastic member between the convex surface and the concave surface.

6. The image forming apparatus according to claim 1, wherein the three pivot shafts are shoulder screws.

7. The image forming apparatus according to claim 1, wherein grounding surfaces of the first leg part, the second leg part, and the third leg part have a spherically rounded shape.

* * * * *